Patented Nov. 4, 1947

2,430,436

UNITED STATES PATENT OFFICE 2,430,436

PREPARATION OF 4-METHYL-4-ALKOXY-2-PENTANONES

John B. Tindall, Terre Haute, Ind., assignor to Commercial Solvents Corporation, Terre Haute, Ind., a corporation of Maryland No Drawing. Application October 26, 1944, Serial No. 560,520

1 Claim. (Cl. 260—594)

This invention relates to a method for preparing 4-methyl-4-alkoxy-2-pentanones, and more particularly to a process which affords more efficient recovery of product than has been possible heretofore.

The preparation of 4-methyl-4-alkoxy-2-pentanones by the reaction of mesityl oxide with an aliphatic alcohol was first carried out in the presence of an acid catalyst, and was practiced according to this method on a laboratory scale in which low conversions of the order of 20–25% or less were obtained.

More recently it has been found that 4-methyl-4-alkoxy-2-pentanones (alkyl diacetone ethers) can be prepared by the reaction of mesityl oxide with an aliphatic alcohol in the presence of an alkaline catalyst to produce higher yields than those produced by the use of an acid catalyst.

A drawback to the use of the basic catalyzed process for the preparation of these ethers is the fact that the ethers are extremely sensitive to the action of strong bases, as well as to strong acids, particularly at elevated temperatures, the ethers reverting back to the alcohol and the mesityl oxide when attempts are made to recover them by distillation. Moreover, as the distillation proceeds, the removal of the excess of reactants tends to promote an equilibrium favoring the decomposition to the original reactants at the expense of the ethers, where even slight excesses of acid or base are present. Neutralization of the acid or base in the usual way before distillation, for example by adding mineral acid until the solution was neutral to an indicator, proved ineffective to prevent decomposition during the recovery steps due possibly to the anomalous behavior of indicators in organic solvent solution.

Neutralization by the addition of weighed quantities of acid, calculated to exactly neutralize the amounts of base added, was likewise unsatisfactory on a commercial scale because of the concentration variations of the technical grade reagents used, the lack of precision scales for weighing, and the use of factory operators, making precision neutralization practically impossible.

I have now found that these difficulties are overcome and that virtually "fool proof" commercial recovery of high yields of 4-methyl-4-alkoxy-2-pentanones is insured by my process which permits of a relatively much wider tolerance of acid or base concentration variation, and in which the pH of the reaction mixture in which the 4-methyl-4-alkoxy-2-pentanols are formed is brought to a value between about pH 4 and pH 9, and the pH is maintained within these limits during the recovery of the reaction product.

In carrying out my process, I mix the mesityl oxide and aliphatic alcohol reactants with a small amount of base such as sodium or potassium hydroxide as catalyst. I prefer to first dissolve the base in one of the reactants, for example in the alcohol, and then add the other reactant slowly. Although the reactants combine in equimolecular proportions, I have found that an excess of one or the other is desirable to insure completeness of reaction and this can advantageously be accomplished by the use of an excess of alcohol as this is usually less expensive than the mesityl oxide. Since the equilibrium of the reaction favors the formation of the ether at low temperatures, I prefer to maintain the temperature at a relatively low value, for example between about 15° C. and 25° C. during the mixing of the reactants and during a subsequent period while the major portion of the reaction is taking place, usually a period of several hours. Agitation is helpful during this period to promote intimate contact between the reactants. After completion of the reaction, the mixture is neutralized in such a manner as to bring the pH value within the range of about pH 4 to pH 9, and to insure its maintenance within this range throughout the recovery steps, at least during the period during which elevated temperatures are employed. I insure this maintenance of pH by utilizing a buffer acid in the neutralization step as part or all of the acid used to combine with the basic catalyst. The amount of buffer acid used and the proportion of non-buffer acid will vary with the individual acids. These proportions can be calculated from the known pH values attributable to the compounds formed in the neutralization step. I have found that phosphoric acid and acetic acid are both satisfactory buffer acids. Some buffer acids can be used alone or in combination with other acids to insure maintenance of the pH within the indicated range, depending on the pH of the salts formed upon neutralization. If phosphoric acid is used alone, a quantity of between two and three equivalents calculated on the amount of basic catalyst used should be employed. Two equivalent quantities insure, if sodium hydroxide is the base, through the formation of sodium dihydrogen phosphate ($NaH_2PO_4$) a pH of about 4. Three equivalents, through the formation of disodium hydrogen phosphate ($Na_2HPO_4$) results in a buffered solution at pH of about 9. An intermediate quantity forms a mixture of the two salts and brings the pH somewhere between these two extremes. On the other hand, a smaller quantity of phosphoric acid can be used, and the remainder of the base neutralized with another, non-buffering acid, added in quantities calculated to give the desired pH range, but insufficient to overcome the buffering action of the phosphoric acid compound.

The use of acetic acid alone as the buffering acid is not suitable because through the formation of sodium acetate, the mixture would have a pH of about 11. However, the use of a limited quantity of acetic acid with a major but less than equivalent proportion of non-buffering acid such as hydrochloric or sulfuric acids is entirely satisfactory and insures first against over acidity by the use of less than the acid equivalent, and against over alkalinity by the use of only minimum proportions of the acetic acid.

The use of other known buffer acids and combinations with non-buffer acids will suggest themselves to those skilled in the art, and the utilizable proportions can readily be calculated from the known dissociation constants and pH values of the resulting salts.

After neutralization of the basis catalyst as described above, the buffered mixture may be recovered by treatment at elevated temperatures without danger of decomposition of the ether, with resulting loss of product.

The actual recovery of the ether may be effected by any desired known method, for example, by steam distillation of the entire mixture, or by fractional distillation or other expedient. I find it convenient to first distill the mixture to remove the alcohol if the reaction is one in which an alcohol is used whose boiling point is below that of water, after which the remaining liquid is cooled to room temperatures and readily separates into two layers. The lower aqueous layer may be drawn off, and the oily layer further distilled to remove water and unreacted mesityl oxide leaving the 4-methyl-4-alkoxy-2-pentanone, which can be further purified, for example by distillation if desired.

The following specific examples will further illustrate my invention.

EXAMPLE I

*4-methyl-4-methoxy-2-pentanone (methyl diacetone ether)*

A reaction kettle equipped with a distillation column was charged with 118 parts of methanol and 2.125 parts of flake caustic soda (NaOH), these quantities representing the proportions of 3.7 moles of methanol to .053 mole of caustic. The mixture was agitated for one hour and then 216 parts (2.21 moles) of mesityl oxide was added slowly over a period of about 40 minutes while maintaining the temperature of the mixture at about 15–16° C. The mixture was agitated for a period of about four hours while continuing to maintain the temperature at about 15–16° C. The reaction mixture was then neutralized by adding thereto a solution of 5.19 parts of 85% phosphoric acid in 60 parts of water, these quantities being in the proportion of .045 mole of phosphoric acid or .135 mole equivalent based on the caustic. The mixture was then distilled to remove the excess of methanol, after which the remaining liquid was cooled to 25° C. whereupon two layers formed. The lower aqueous layer had a pH of 5.3. It was drawn off and after recovery of the methanol it contained, was discarded. The oily layer containing the ether product was distilled to remove water and unreacted mesityl oxide. This left 143 parts of a residue, 95% of which was 4-methyl-4-methoxy-2-pentanone (methyl diacetone ether). Upon distillation this resulted in 137.2 parts of product corresponding to a conversion of 47.7%.

EXAMPLE II

*4-methyl-4-methoxy-2-pentanone*

Six hundred and forty parts of methanol were placed in a reaction vessel equipped with a distillation column together with 11.12 parts of sodium hydroxide as catalyst, representing proportions equivalent to 20 moles of methanol and 0.278 mole of NaOH. To this mixture was added 1176 parts (12 moles) of mesityl oxide slowly while maintaining the temperature of the mixture at about 15° C. The mixture was agitated for a period of about four hours after which it was neutralized by the addition of 23.8 parts of phosphoric acid, that is, a quantity in the proportion of .243 mole or .728 acid equivalent. The mixture was then distilled to remove the excess methanol. The residue was then cooled to about 25° C. whereupon two layers formed. The lower aqueous layer was drawn off and was found to have a pH of 5.4. The oil layer was distilled, first to remove unreacted mesityl oxide, and then to recover the product which amounted to 789 parts of 4-methyl-4-methoxy-2-pentanone corresponding to a conversion of 50.6%.

EXAMPLE III

*4-methyl-4-ethoxy-2-pentanone (ethyl diacetone ether)*

A mixture of 294 parts of mesityl oxide and 230 parts of ethyl alcohol containing 3.396 parts of sodium hydroxide, representing proportions equivalent to 3 moles of mesityl oxide, 5 moles of ethyl alcohol and 0.0849 mole of sodium hydroxide was allowed to stand for seventeen hours at 18° C. Then 125 parts of 1.7577 N (0.2197 equivalent) phosphoric acid was added and the mixture was distilled through a packed column to 84° vapor temperature. The distillate, mostly ethyl alcohol, weighed 203.7 g. The residue was cooled and the lower aqueous layer separated. This aqueous layer had a pH of 5.1. The oil layer was distilled, water only being removed from the distillate, until the vapor temperature reachced 124° C. Distillation was continued at 15 mm. pressure, the following fractions being obtained:

| | |
|---|---|
| 190.0 parts mesityl oxide | 33° C. |
| 0.0 parts | 33–43° C. |
| 6.0 parts | 48–62° C. |
| 125.2 parts ethyl diacetone ether | 62° C. |
| 4.2 parts all liquid | Residue |

The 125.2 parts of ethyl diacetone ether represents a conversion of 29% based on the mesityl oxide used.

EXAMPLE IV

*4-methyl-4-butoxy-2-pentanone (butyl diacetone ether)*

A mixture of 294 parts of mesityl oxide, 370 parts of 1-butanol and 5.05 parts of potassium hydroxide, representing proportions of 3 moles of mesityl oxide, 5 moles of 1-butanol and 0.09 mole of potassium hydroxide, was held for 18 hours at 18° C. and then treated with 133 parts (0.2318 equivalent) of phosphoric acid. The mixture was agitated and allowed to stand until the layers had separated. The lower aqueous layer after separation had a pH of 5.2. The oil layer was distilled through a packed column at atmospheric pressure, water only being taken off, until the vapor temperature was 116° C. Distillation was continued at 15 mm. and the following cuts were obtained:

477.5 parts 1-butanol and mesityl oxide __ 33–38°
2.1 parts _____ 38–89°
165.0 parts butyl diacetone ether _____ 89–91°
8.1 parts all liquid _____ residue The conversion based on the mesityl oxide used was 32%.

EXAMPLE V

One hundred and sixty parts of methanol were placed in a reaction vessel equipped with a distillation column and 2.98 parts of sodium hydroxide was added and the mixture agitated until the sodium hydroxide had dissolved, the quantities employed being in the proportion of 5 moles of methanol to 0.0746 mole of sodium hydroxide. Then 294 parts of mesityl oxide, a quantity in the proportion of 3 moles, was added slowly while maintaining the temperature of the mixture between about 15–20° C. Agitation of the mixture was continued for about four hours, after which it was neutralized with 3.3 parts (0.0673 acid equivalent) of sulfuric acid and 0.6 parts (0.0189 acid equivalent) of phosphoric acid. The mixture was distilled to 85° C. to remove the excess methanol. The residue was then cooled to about 25° C., whereupon two layers formed. The lower aqueous layer was drawn off and was found to have a pH of 4.8. The oily layer was distilled, first to remove unreacted mesityl oxide, and then to recover the product which amounted to 195 parts of 4-methyl-4-methoxy-2-pentanone corresponding to a conversion of 49.8%.

EXAMPLE VI

One hundred and sixty parts of methanol were placed in a reaction vessel together with 2.98 parts of sodium hydroxide, the quantities used being in the proportion of 5 moles of methanol and 0.0746 mole of sodium hydroxide. The mixture was agitated until the sodium hydroxide had dissolved and then 294 parts, a quantity in the proportion of 3 moles, of mesityl oxide was added slowly while maintaining the temperature of the mixture between about 15 and 20° C. Agitation of the mixture was continued for about four hours after which the mixture was neutralized with 0.396 part (.0066 acid equivalent) of acetic acid and 2.5 parts (.0685 acid equivalent) of hydrochloric acid. The mixture was distilled to 85° C. to remove the excess of methanol. The residue was cooled to about 25° C. whereupon two liquid layers formed. The lower aqueous layer was drawn off and found to have a pH of 9.0. The oily layer was distilled, first to remove unreacted mesityl oxide and then to recover the product which amounted to 181.2 parts of 4-methyl-4-methoxy-2-pentanone corresponding to a conversion of 46.4%.

While the above describes the preferred embodiments of my invention, it will be understood that departures may be made therefrom within the scope of the specification and claim.

What is claimed is:

In a process for preparing 4-methyl-4-methoxy-2-pentanone by the reaction of mesityl oxide with methyl alcohol in which the reaction is carried out in the presence of an alkaline catalyst, the steps which comprise neutralizing the alkaline catalyst with a buffer acid upon completion of the reaction, and maintaining the pH of the reaction mixture between about pH 4 and pH 9 during the recovery of the reaction product.

JOHN B. TINDALL.

REFERENCES CITED

The following references are of record in the file of this patent:

UNITED STATES PATENTS

| Number | Name | Date |
|---|---|---|
| 1,823,704 | Simms | Sept. 15, 1931 |
| 2,309,650 | McAllister | Feb. 2, 1943 |
| 2,000,244 | Merrill | May 7, 1935 |

OTHER REFERENCES

Britton, "Hydrogen Ions," 1929, pp. 180–193.